United States Patent [19]

Mason

[11] 3,997,108
[45] Dec. 14, 1976

[54] AUTOMATIC AIR FLOW CONTROL

[76] Inventor: George F. Mason, 9 Gene St., East Haven, Conn. 06512

[22] Filed: June 23, 1975

[21] Appl. No.: 589,250

[52] U.S. Cl. .............................. 237/1 A; 126/270; 237/46; 237/50

[51] Int. Cl.² ........................................... F24J 3/02

[58] Field of Search ...................... 237/1 A, 46, 50; 126/400, 270, 271

[56] References Cited

UNITED STATES PATENTS

| | | | |
|---|---|---|---|
| 2,469,496 | 5/1949 | Christenson | 237/1 A |
| 2,484,127 | 11/1949 | Stelzer | 126/270 |
| 2,553,302 | 5/1951 | Cornwall | 237/1 A |
| 2,559,869 | 7/1951 | Gay | 126/270 |
| 2,559,871 | 7/1951 | Gay | 126/270 |
| 2,680,565 | 6/1954 | Löf | 237/1 A |
| 3,236,294 | 2/1966 | Thomason | 126/400 |
| 3,412,728 | 11/1968 | Thomason | 126/270 |
| 3,812,903 | 5/1974 | Thomason | 126/400 |
| 3,902,474 | 9/1975 | Pyle | 126/270 |

Primary Examiner—John J. Camby
Assistant Examiner—Henry C. Yuen
Attorney, Agent, or Firm—DeLio and Montgomery

[57] ABSTRACT

An automatic air flow control system for a solar heating installation wherein thermostatically controlled dampers are associated with such solar heating elements as the collector and the storage area, and with the rooms to be heated, the thermostats being pre-settable to program their operations, with minimal supervision, in response to variable heat supply at the collector and variable heat demand in the rooms to be heated.

6 Claims, 7 Drawing Figures

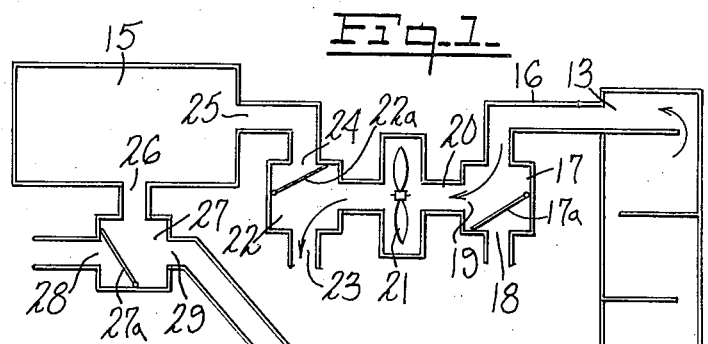
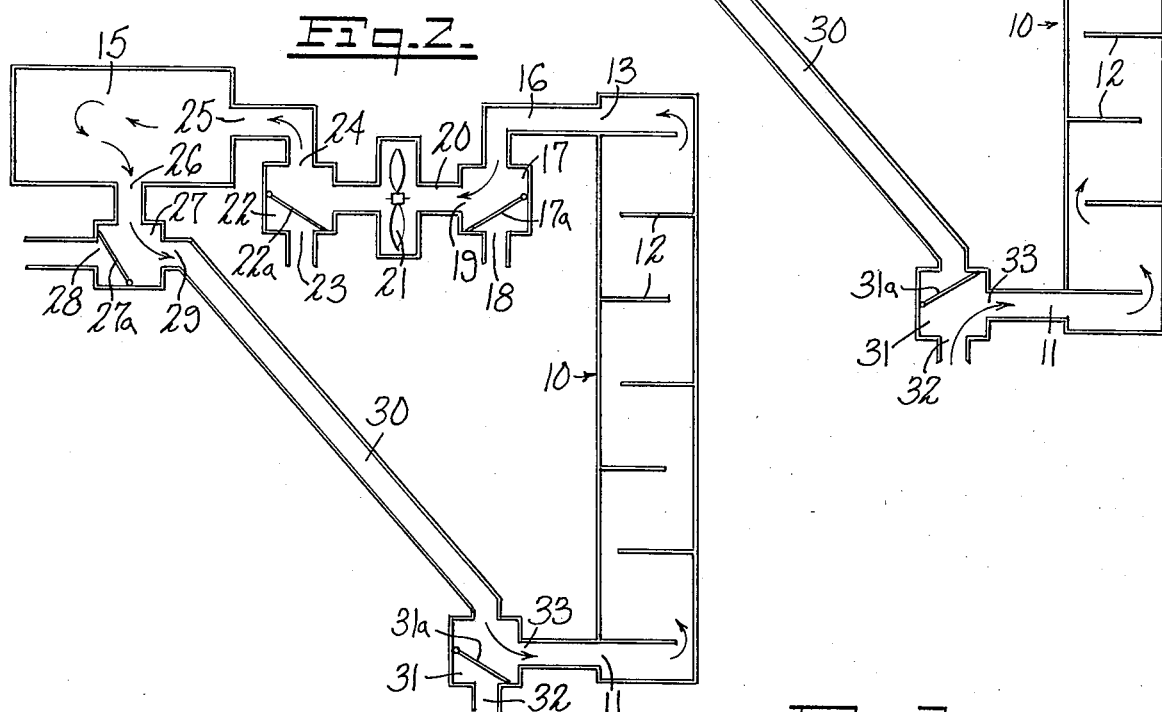
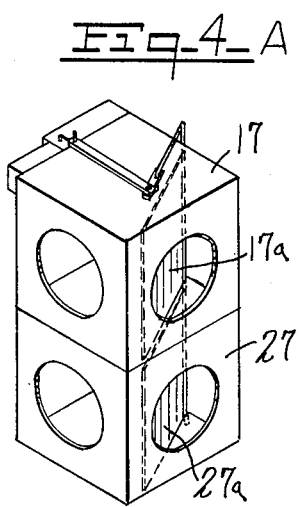
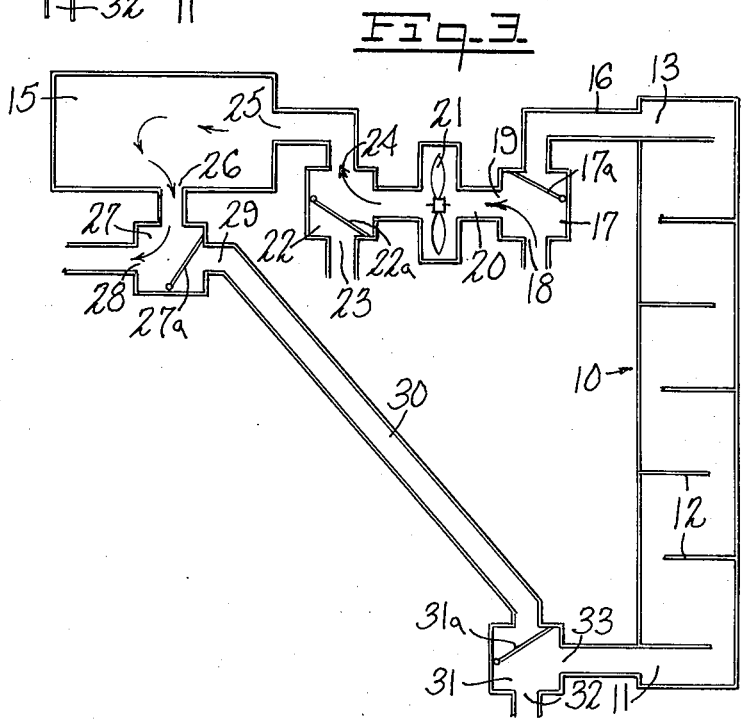

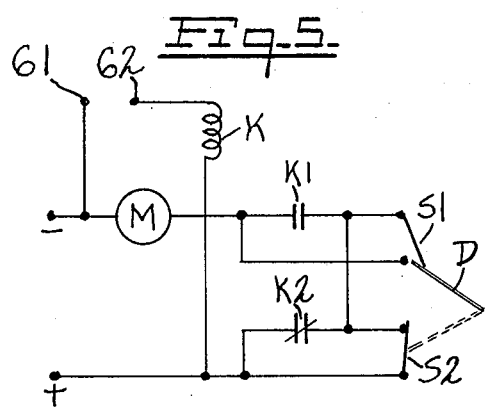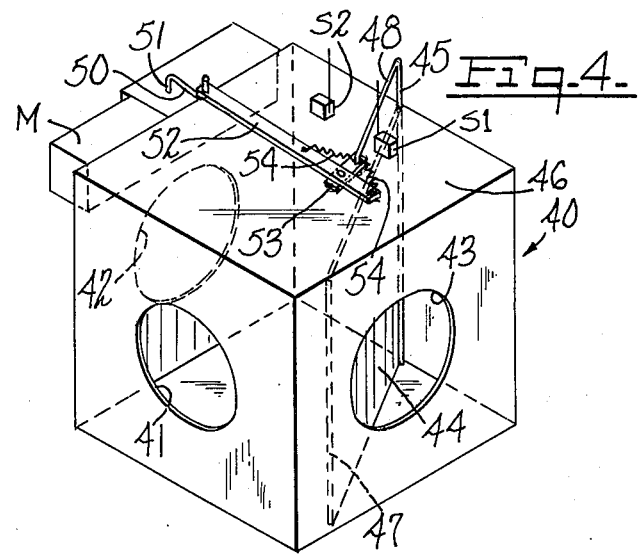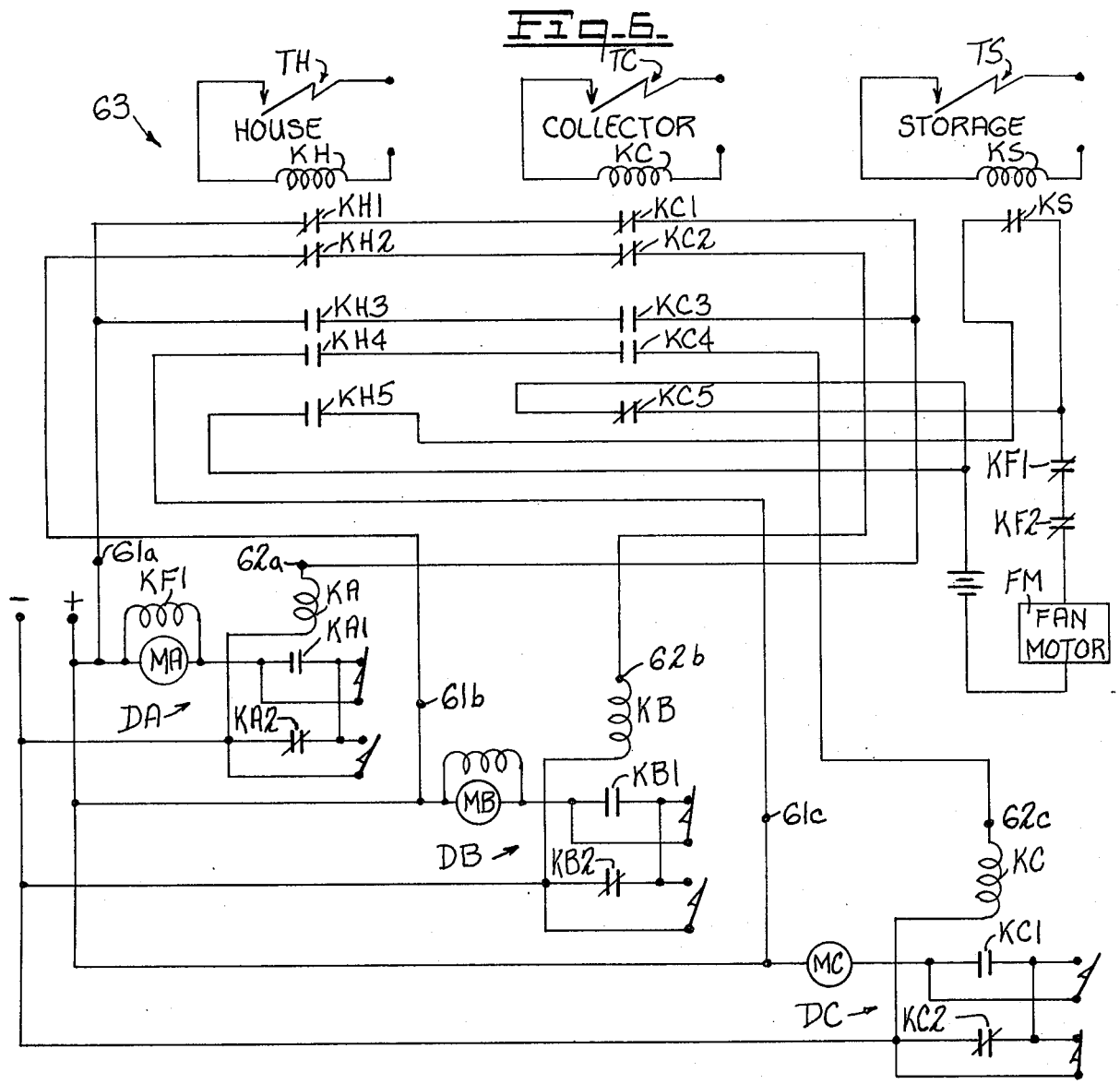

AUTOMATIC AIR FLOW CONTROL

This invention relates to an automatic air flow control system for a solar heating installation wherein thermostatically controlled dampers are associated with such solar heating elements as the collector and the storage area, and with the rooms to be heated, the thermostats being pre-settable to program their operations, with minimal supervision, in response to variable heat supply at the collector and variable heat demand in the rooms to be heated.

The essential elements of a simple solar heating installation comprise a collector, for receiving the sun's rays and transmitting their heat to a fluid such as air, a storage bin containing heatable materials to which the fluid can deliver any heat which is not used for heating the rooms of a house, ducts for conveying the heat-transfer fluid along a desired course between the collector, storage bin and rooms, one or more fans to drive and/or draw the fluid along its course and one or more dampers or the like, adjustable to positions which will direct the fluid along the particular course which may be suitable or desired at any given moment.

The most basic element is the collector which picks up thermal energy from the sun's rays and heats the transfer fluid for use as needed. The collector is also the most unpredictable element, since it depends on exposure to the sun which can take place (effectively) during only about 10 hours of any day, and is subject to interruptions at any time, depending on weather conditions, and is also subject to variations in the intensity of the solar radiation. The number of hours of darkness at any given season can, of course, be calculated, and ideal operation of a solar heating system would include the collection and storage of enough thermal energy, during the sunny hours, to heat the house adequately during the dark hours. Since it is normally impossible to anticipate ideal conditions over any given period of time, a system should have excess collecting capacity and excess storage capacity, if auxiliary heating is not to be relied on. It is also desirable to provide the installation with an automatically operating air flow control system, such that changing conditions of heat supply and demand can be responded to promptly, for optimum utilization of the available thermal energy.

It is therefore an object of the present invention to provide flow control means which, when properly set, will respond automatically to such combinations of conditions, and changes thereof in any normal sequence, as the following:

Collector operating, house needs and receives heat.

Collector operating, house warm enough, heat to storage.

Collector not operating, house needs and receives heat from storage.

Collector not operating, house needs heat, storage cool.

It is a further object to provide an improved damper unit which may be standardized for installation at any required point in the system, whereby the dampers are interchangeable and a supplier needs to stock only a single model.

It is another object to provide improved circuitry for the system, with the simplest possible elements, readily available for servicing as needed.

It is a still further object to provide certain improvements in the form, construction and arrangement of the several parts whereby the above named and other objects may effectively be attained.

The invention accordingly comprises the features of construction, combination of elements, and arrangement of parts which will be exemplified in the construction hereinafter set forth, and the scope of the invention will be indicated in the claims.

A practical embodiment of the invention is shown in the accompanying drawings, wherein:

FIG. 1 is a diagrammatic representation of the elements of a solar heating system, and their inter-relation, with dampers set to circulate warm air from the collector through the house;

FIG. 2 is a similar diagrammatic representation with the dampers set to circulate warm air from the collector to storage;

FIG. 3 is a similar diagrammatic representation with the dampers set to circulate warm air from storage to the house;

FIG. 4 is a somewhat diagrammatic isometric projection of a suitable form of damper for controlling the air flow;

FIG. 4A is a view like FIG. 4, showing the stacking of one damper on another;

FIG. 5 is a diagram of the damper circuit; and

FIG. 6 is a circuit diagram showing the pertinent elements for controlling automatically the operation of the system.

Since the specific details of air circulation within a house, to and from one or more rooms thereof, will vary according to the size and design of each individual house, FIGS. 1, 2 and 3 show only ducts which supply air to a house and receive air from a house, regardless of any additional ducting in the house. The location of the heating system elements will be indicated below.

Referring to the drawings, the system includes a solar heat collector 10, of any effective type, designed to receive solar thermal energy and to transfer it to an air stream which may be circulated through the collector. As shown, the collector has an inlet end 11, a series of baffles 12 causing the air to follow a serpentine path, and an outlet end 13. The dimensions and shape of the collector may vary widely but it will normally include one or more flat black surfaces (plastic or painted metal) for solar heat absorption and one or more air passages adjacent to said surfaces. It must, obviously, be placed in a location where its heat absorbing area is exposed to direct sunlight for as many hours a day as possible, and at the most favorable average angle or angles. Any exposed adjacent ducting may also be made of black material to supplement the heat absorption in the collector.

A storage unit is essential if the system is to be operative at times when the sun is not shining on the collector, as at night or on a cloudy day. In one type of storage unit a well insulated bin is provided with an array of water-filled plastic bottles (e.g., 1000 1-gallon bottles) suitably disposed to permit air circulation and heat exchange. In another type the bin is filled with a quantity of rocks of graduated sizes, supported and distributed in such a manner that air can be passed through the mass. A rock-filled storage unit can be structurally associated with the collector or can be located elsewhere, as in the basement or more or less buried; wherever located it has the advantage, over water bottles, that it can never be frozen in cold weather. The storage unit 15, shown herein, may be of any suitable type, but the rock type is preferred.

In the air circulation path shown, the collector outlet 13 is connected by a duct 16 to a first damper 17, 17a having an alternative inlet 18 from the house and an outlet 19 to a duct 20 containing a fan 21. From the fan the air path goes to a second damper 22, 22a having an outlet 23 to the house and an outlet 24 to the inlet 25 of the storage unit 15. The storage outlet 26 connects with a third damper 27, 27a having an outlet 28 to the house and an outlet 29, connected by the duct 30 to a fourth damper 31, 31a which has an inlet 32 from the house and outlet 33 to the inlet end 11 of the collector.

The same parts are shown in each of FIGS. 1, 2 and 3, with dampers adjusted to positions appropriate for the respective principal modes of operation, as will be explained below.

A suitable damper construction is shown in FIG. 4 wherein the housing 40 is in the form of a rectangular box having a vent opening 41 in one end wall, vent openings 42, 43 in two side walls and a vane or flap 44 fixed to a vertical axle 45 pivotally mounted adjacent the end wall 46. The vane or flap 44 is of a size to swing freely with minimum clearance between the bottom and top walls and its free edge may desirably be provided with a resilient sealing strip 47 such as a rubber "weather strip" to seal tightly against each side wall and to muffle the sound of coming in contact with the respective wall. A lever arm 48 is fixed to the upper end of the axle 45 and extends across the top of the damper, parallel to the vane or flap, between upwardly projecting limit switches S1, S2. Actuation of the vane or flap is effected by a small motor M driving gears (not shown) to rotate a crank 50 on the gear shaft 51. The crank is connected to the lever arm 48 by a long link 52 and, preferably, a short link 53 which is centered by springs 54, the effect of which is to permit closing of the damper vane or flap against either side wall with a yielding contact or squeezing action, whereby precise adjustment of the throw of the crank 50 is not required.

In FIGS. 1, 2 and 3, the air circulation paths are indicated by arrows and flow lines.

The condition illustrated in FIG. 1 is that wherein the collector 10 is receiving thermal energy, by exposure to the rays of the sun, and is therefore capable of collecting heat either for use or for storage. The house is cool enough so that its thermostat TH calls for heat. In response to this call, the damper vane 17a opens the passage through ducts 16 and 20 to the fan 21, the damper vane 22a closes the outlet 24 (to storage) and opens the outlet 23 to the house, and the damper vane 31a opens the return passage between inlet 32 from the house through outlet 33 to the inlet end 11 of the collector. Cool air from the house is drawn in through inlet 32, passed through the collector and returned to the house as warm air through the outlet 23, this circulation continuing until the house thermostat TH stops calling for heat (or the collector thermostat TC indicates that no more is available from the collector).

At the completion of the house heating cycle, just described, and assuming that the sun is still shining on the collector, the control circuit (described below) shifts the dampers to the condition illustrated in FIG. 2 where heat is being stored in the storage bin 15. The damper vane 17a is in the same position as before, opening the passage from the collector to the fan, but damper vane 22a is switched to close the outlet 23, leading directly to the house, and to open the outlet 24, so that the air passes through duct 25 to the storage bin 15. The damper vane 27a closes the outlet 28 (to the house) and opens outlet 29 so that air from storage can pass through the duct 30, and damper vane 31a closes the inlet 32 (from the house) to permit air to pass through outlet 33 for recirculation through the collector. The controls are set to maintain this storage cycle as long as the collector is warmer than the storage bin; since the air which is recirculated through the collector may be somewhat warm as it comes from storage, the air passing to storage can, under good collecting conditions, become relatively super-heated and correspondingly large amounts of thermal energy can be stored for future use. When the collector ceases to be effective, as due to clouds or darkness, all circulation is stopped by turning off the fan.

If the house calls for heat when the collector is unable to supply it, the circulation path shown in FIG. 3 is set up. Here, the damper vane 17a is turned to close the inlet from the collector and open the inlet 18 from the house; the fan draws cool air in from the house and passes it through damper 22, outlet 24 and inlet 25 to the storage bin 16; from storage, where the air is warmed, it goes to damper 27 and through outlet 28 to the house, damper vane 27a being switched to cut off the duct 30.

Since heat is supplied normally either by the collector (FIG. 1) or by the storage bin (FIG. 3), never both at once, the damper vanes 17a and 27a will always move in unison. The dampers 17 and 27 may, if desired, be combined in a single unit, one damper above the other as indicated in FIG. 4A, with the respective vanes or flaps on a single axle.

The damper vanes are positioned through a motor control. A separate control is provided for each of dampers 22 and 31, while damper vanes 17a and 27a are shown as being operated together.

A typical control circuit for a damper is shown in FIG. 5 and comprises a damper motor M, a relay K having controlled contacts K1 and K2 and limit switches S1 and S2. Rely K will be energized when a circuit is closed between terminals 61 and 62. The limit switches are normally closed, but are opened by contact by the damper arm D (48 in FIG. 4). As shown in FIG. 5, the motor M is not energized since both switch S1 and contact K1 are open. If relay K should be energized, contact K1 is picked up and contact K2 is dropped out. This circuit arrangement provides a circuit through motor M by way of switch S2 and picked-up contact K1. Motor M will then operate to drive damper arm D to the opposite position. When the damper arm opens the switch, the circuit to motor M is opened and movement of the damper is halted. The circuit will remain in this condition and the damper arm in the position holding S2 open until relay K is de-energized. When this occurs, the contacts return to the position shown in FIG. 5 and another circuit is established to motor M through contact K2 and switch S1. The motor will then operate until the damper arm D returns to the position shown, to open switch S1 breaking the circuit to motor M.

In the embodiment of the invention shown, three damper controls DA, DB, and DC are utilized and are shown in FIG. 6. The damper controls DA, DB, and DC are identical to the circuit shown in FIG. 5, except that controls DA and DB include fan control relays KF1 and KF2. The relays KA, KB and KC are energized or de-energized in response to the condition of a controller circuit 63 which is further responsive to the settings of thermostats TH, TC and TS. Thermostat TH senses the temperature of the house, and is normally open if the house is up to a predetermined temperature. If thermostat TH closes, it energizes a relay KH. Thermostat TC senses the temperature in the collector and is open when the collector is above a predetermined temperature. If relay TC should close, it energizes a relay KC. Thermostat TS senses the temperature in storage and if the temperature falls below a predetermined value it will energize the relay KS.

Relay KH controls a plurality of contacts KH1–KH5. Relay KC controls contacts KC1–KC5. Relay KS has one control contact KS1 in circuit with fan motor FM. The fan motor FM may be energized through normally closed contact KC5, or through normally opened contact KH5 when contact KS1 is closed.

If all thermostats are open, the circuit is as shown in FIG. 6 and the air flow circuit is as shown in FIG. 2. Damper control DA controls the position of arm 22a of damper 22. Damper control DB controls the position of arm 31a of damper 31 and damper control DC controls the position of arms 17a and 27a of dampers 17 and 27 respectively. Relays KA and KB are energized and relay KC is not energized, as shown in FIG. 6.

Assume now that thermostat TH senses cooling of the house and closes. Relay KH is energized and reverses its contacts from that shown in FIG. 6. When contacts KH1 and KH2 drop out, relays KA and KB are de-energized. The motors MA and MB are then placed in circuit and drive dampers 22a and 31a to the position shown in FIG. 1. At this point, storage 15 is out of the air flow circuit and air flows through opening 32 over the collector and to the house through opening 23. During the time that the motor is operating to change the dampers, relays KF1 and KF2 are energized, dropping out their normally controlled contacts KF1 and KF2 in the fan motor circuit to temporarily halt operation of fan 21.

Assume that after a period of time the temperature in the collector falls, which is sensed by a thermostat TC and relay KC is energized. At this time the house thermostat TH is still calling for heat. Contact KC3 closes and a circuit is closed between terminals 61a and 62a of relay KA, thus energizing relay KA. Motor MA will be energized to drive damper 22a to the position shown in FIG. 3. Relay KC is energized when contact KC4 closes, thus creating a circuit through motor MC, which drives the dampers 17a and 27a to the position shown in FIG. 3. The fan is temporarily interrupted during change of position of the dampers as previously described and the house is heated by air drawn through opening 18 by fan 21 into storage 15 and back into the house through opening 28 in damper 27.

If the temperature in storage now falls below a predetermined value, thermostat TS will close, relay KS will be energized and operation of the fan will cease. The system will then be inoperative until the collector temperature rises to a predetermined value at which time thermostat TC will open, de-energizing relay KC. When contact KC opens, relay KC is de-energized, and motor MC is energized to drive dampers 17a and 27a to the position shown in FIG. 1.

The fan circuit is closed through contact KC5. Since contact KH2 is open, there will be no change in state of relay KB and the air flow circuit will return to that shown in FIG. 1.

In the foregoing manner the dampers are automatically controlled to place the system in a condition determined by the need for, and availability of heat in each of the elements, house (space to be heated), collector and storage unit.

Other advantages of the system include the fact that its power consumption is low and all elements could be operated on a 12 volt battery if necessary or preferred. The collector and storage may be adjacent or separated, as desired. The system is designed to make efficient use of all available heat, by collection and storage of thermal energy whenever the collector is functioning.

The relay coils can be equipped, in a conventional manner, with indicator lights to show the status of all elements, i.e., whether or not the collector is functioning.

The system is so designed that a minimum installation of collector, storage unit and one automatic damper could be used initially, with other dampers added subsequently, in order to spread the expense.

It may thus be seen that the objects of the invention set forth as well as those made apparent from the preceding description are efficiently attained and, since certain changes may be made in the above construction without departing from the spirit and scope of the invention, it is intended that all matter contained in the above description or shown in the accompanying drawings shall be interpreted as illustrative and not in a limiting sense.

What I claim is:

1. A solar heating system comprising a collector having an inlet end and an outlet end, a heat storage unit having an inlet end and an outlet end, a space to be heated, air ducts interconnecting in series in a closed system said collector and storage unit and air ducts connecting parts of said system to said space, a fan operatively associated with said first named ducts downstream of the collector, a plurality of dampers in series in said system each adjustable to alternative positions for establishing a desired air flow circuit, and an electrical operating circuit for controlling automatically the adjustment of the dampers and operation of the fan, a first damper being located between the outlet end of the collector and inlet end of the storage unit and being adjustable to connect the outlet end of the collector alternatively to the inlet end of the storage unit or to the space to be heated, a second damper being located between the outlet end of the storage unit and inlet end of the collector and being adjustable to connect the inlet end of the collector alternatively to the storage unit or to the space to be heated, third and fourth dampers being located at opposite ends of the storage unit and adjustable to connect both ends of the storage unit with the space to be heated, the electrical circuit including thermostats in the collector, storage unit and space to be heated, and said electrical circuit being adapted to actuate dampers and the fan to cause warm air to be supplied to said space on demand of the thermostat therein when either other thermostat indicates that warm air is available from the collector or from the storage unit.

2. A solar heating system according to claim 1 wherein the collector thermostat is adapted to cause elimination of the collector from the air flow circuit upon drop of temperature in the collector.

3. A solar heating system according to claim 2 wherein the storage thermostat is adapted to maintain the storage unit in the air flow circuit as long as the storage temperature is sufficiently high and the space thermostat demands heat.

4. A solar heating system according to claim 1 wherein the electrical circuit is adapted to actuate dampers and the fan to cause warm air to be supplied to the storage unit by the collector when the space thermostat does not demand heat and the collector temperature is sufficiently high.

5. A solar heating system according to claim 1 wherein the electrical circuit includes means for stopping the fan while dampers are being moved.

6. A solar heating system according to claim 1 wherein each damper has a position in which an air passage is opened through the damper to the space to be heated.

* * * * *